US010205775B2

(12) United States Patent
Abushaban

(10) Patent No.: US 10,205,775 B2
(45) Date of Patent: Feb. 12, 2019

(54) SERVER SELECTION IN A HIGHLY AVAILABLE NETWORK

(71) Applicant: ORACLE INTERNATIONAL CORPORATION, Redwood Shores, CA (US)

(72) Inventor: Farouk Abushaban, Colorado Springs, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 899 days.

(21) Appl. No.: 14/583,901

(22) Filed: Dec. 29, 2014

(65) Prior Publication Data

US 2016/0094629 A1    Mar. 31, 2016

(30) Foreign Application Priority Data

Sep. 27, 2014 (IN) .......................... 4760/CHE/2014

(51) Int. Cl.
| | |
|---|---|
| *H04L 29/08* | (2006.01) |
| *G06F 11/07* | (2006.01) |
| *G06F 11/30* | (2006.01) |
| *H04L 29/14* | (2006.01) |

(52) U.S. Cl.
CPC ...... *H04L 67/1025* (2013.01); *G06F 11/0715* (2013.01); *G06F 11/0757* (2013.01); *G06F 11/30* (2013.01); *H04L 67/101* (2013.01); *H04L 67/1034* (2013.01); *H04L 69/40* (2013.01)

(58) Field of Classification Search
CPC .. G06F 11/0715; G06F 11/0757; G06F 11/30; H04L 67/101; H04L 67/1025; H04L 67/1034; H04L 69/40
See application file for complete search history.

(56) References Cited

U.S. PATENT DOCUMENTS

| | | | |
|---|---|---|---|
| 6,490,624 B1 | 12/2002 | Sampson et al. | |
| 7,418,490 B1 | 8/2008 | Zhang et al. | |
| 7,697,512 B1 * | 4/2010 | Allison, III | H04L 12/66 370/352 |

(Continued)

*Primary Examiner* — Gil H. Lee
(74) *Attorney, Agent, or Firm* — Tarolli, Sundheim, Covell & Tummino LLP

(57) ABSTRACT

Systems, methods, and other embodiments associated with a highly available network computer system that does not utilize a load balancer are described. In one embodiment, the system includes a plurality of management application instances configured to manage network devices and a plurality of network devices. Each network device includes computer storage medium storing a registry of management application instances. The registry records, for each management application instance, connection information used to communicate with the management application instance and an associated priority for each management application instance. The network device also includes an agent and selection logic. The agent is configured to identify a network communication intended for a management application instance. The selection logic is configured to access the registry; identify a management application instance in the registry having a highest associated priority; and cause the agent to transmit the network communication to the highest priority management application instance.

20 Claims, 7 Drawing Sheets

(56) References Cited

U.S. PATENT DOCUMENTS

| | | | |
|---|---|---|---|
| 8,200,823 B1 | 6/2012 | Zhang et al. | |
| 9,473,417 B2 | 10/2016 | Reagan et al. | |
| 9,686,287 B2 | 6/2017 | Manton et al. | |
| 2007/0036294 A1* | 2/2007 | Chaudhuri | H04M 3/42153 |
| | | | 379/88.16 |

* cited by examiner

SERVER SELECTION IN A HIGHLY AVAILABLE NETWORK

CROSS REFERENCE TO RELATED APPLICATIONS

This disclosure claims the benefit of Indian Provisional Patent Application serial number 4760/CHE/2014 filed Sep. 27, 2014 titled "Detect Process Health Remotely in a Real-time Fashion", inventors: Rawat, Klein, Sadras, Vedavyas, Kini, Immanueljoseph, Ramacher, Mathur, and Abushaban, and assigned to the present assignee.

BACKGROUND

Highly available networks include multiple servers or management application instances that are each capable of handling requests in concert. During normal operation, the servers operate in parallel, processing different portions of the network traffic. In the event that one of the servers goes offline, network traffic intended for the offline server is automatically routed by way of a Server Load Balancer (SLB) to another server that is online. In this manner, the overall availability of the service is not significantly impacted by the loss of one or more of the multiple servers.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Figure 1:
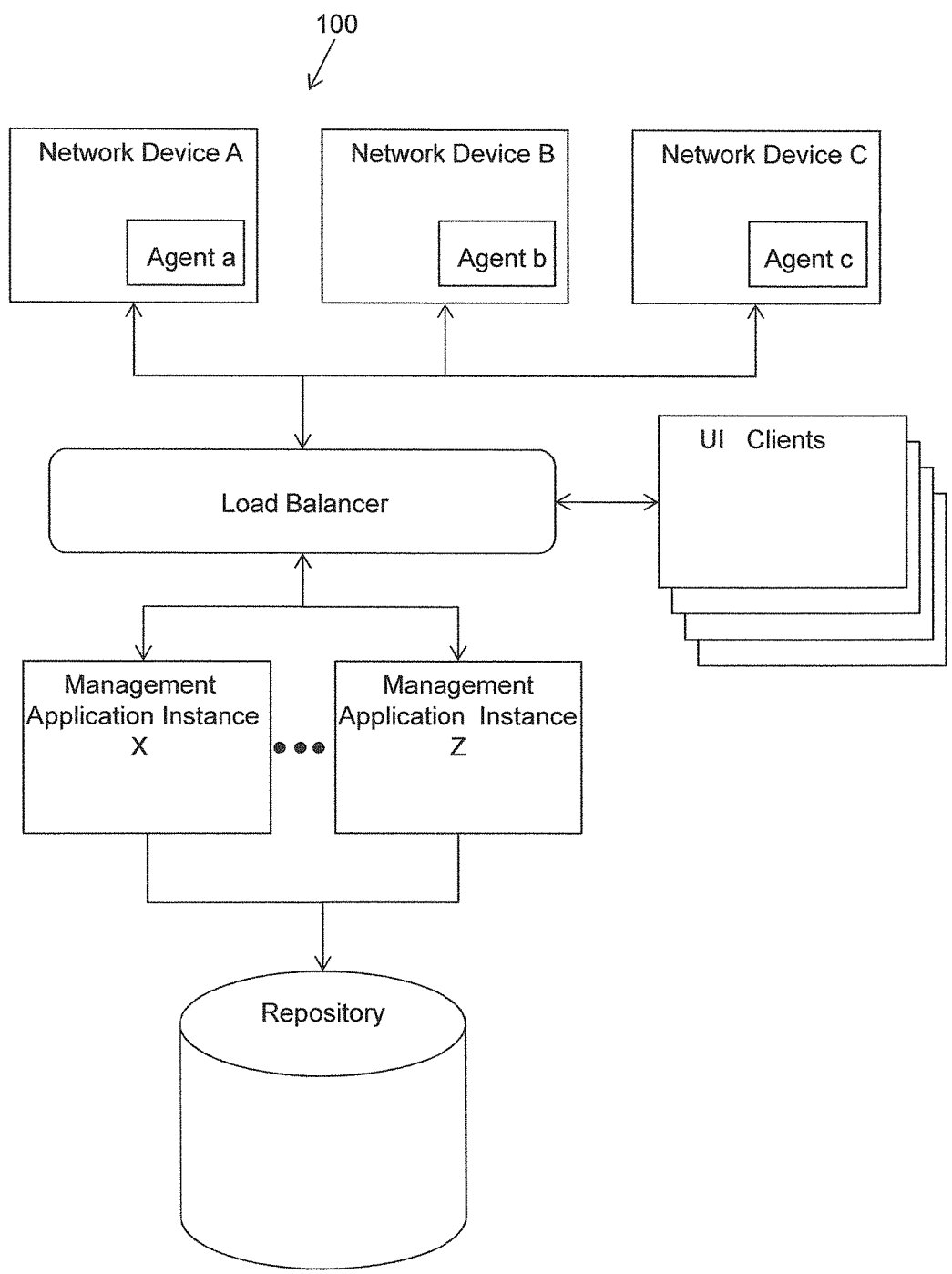
FIG. 1 illustrates a prior art networked computing system that includes a load balancer.

FIG. 1 illustrates a prior art highly available networked computer system 100. The networked computer system 100 includes multiple network devices A-C and multiple management applications X-Z. The network devices may include one or more memories configured to store instructions for implementing various logical components and hardware processors configured to execute the instructions stored in the one or more memories. While only three network devices are shown, many networked computer systems include thousands or even millions of devices.

The network devices are managed by a management application. The management application instances X-Z are redundant instances of the management application implemented in different hardware components. Each management application instance X-Z is capable of managing any of the network devices. The plurality of redundant management application instances are used to provide a highly available networked computing system that is capable of functioning with little performance degradation in the event of a management application instance failure. Performance degradation is minimized by sending work to available (initiated and non-failed) instances without attempting to send work to unavailable (failed or never initiated) instances. In one embodiment, each management application instance is implemented on a separate server and the servers may be geographically remote with respect to one another. While for the purposes of this description, the various management application instances will be described as if the instances were implemented on separate servers, in one embodiment, one or more of the management application instances may be implemented on the same server or a set of related servers. Larger networked computer systems may include several management application instances.

The network devices access a data repository through the management application. The management application is configured to process data from the network devices prior to storing the data in the repository and/or process requests from the network devices for data from the repository. In one embodiment, the network devices include an agent that is configured to control interactions with the management application. User interface (UI) Clients access the management application to view various aggregations of data (e.g., a dashboard) in the repository that are maintained by the management application.

The highly available networked computing system 100 includes a load balancer that acts as a single point of entry for the network devices and the UI clients to the management application instances. The load balancer routes requests for access to the management application from the network devices and UI clients to one of the management application instances. In the event that one of the management application instances becomes unable to process requests (e.g., server failure or maintenance), the load balancer will route incoming requests to active servers and refrain from routing requests to the offline server. In the system 100, the network devices and UI clients are configured to access the management application by way of a single intermediary, the load balancer. The network devices and UI clients are blind to which specific management application instance is servicing their request. If the load balancer becomes inoperable, none of the management application instances can be accessed.

Systems and methods are described herein that provide a highly available network that does not rely on a load balancer to serve as the point of entry to the management application instances. In the described embodiments, network devices and the management application instances are adapted to select a management application instance with which to communicate based on a locally stored registry of management application instances in the network.

Figure 2:
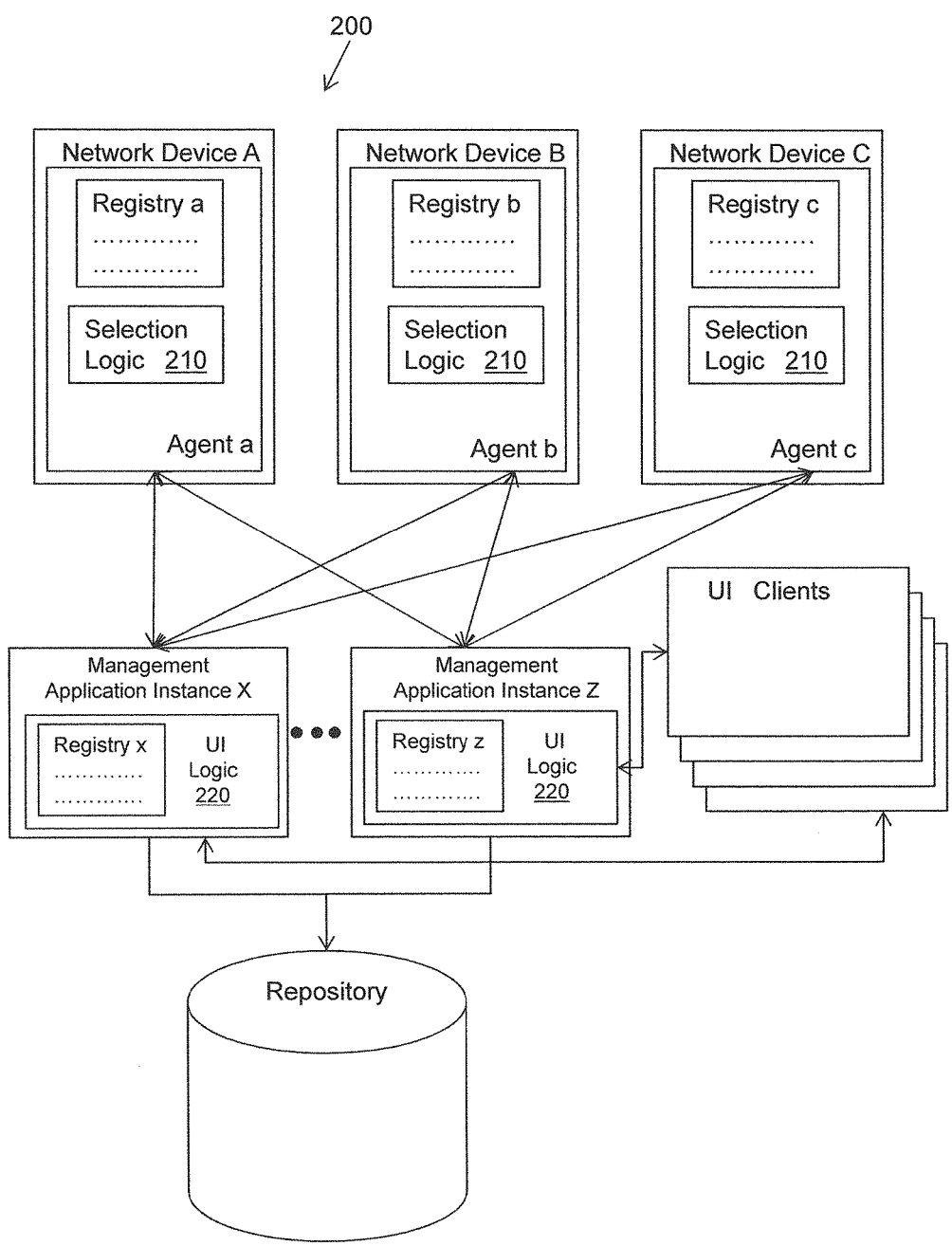
FIG. 2 illustrates one embodiment of a networked computing system associated with server selection in a highly available network.

With reference to FIG. 2, one embodiment of a networked computer system 200 associated with server selection for highly available networks is illustrated. The networked computer system 200 does not require (and, in the illustrated example does not include) a load balancer. In order to provide a highly available network, the computing device agents in the computing devices are configured with a selection logic 210 and a registry. When the computing device has a network communication to send to the management application, the selection logic 210 is configured to select a management application instance from the registry. The agent is configured to establish a communication link directly with the selected management application instance using connection information in the registry for the management application instance.

To eliminate the need for the load balancer for processing UI requests from UI clients, one of the management application instance servers serves as the administrator server. All UI requests are sent to the administrator server. The management application instances include UI logic 220 configured to access a registry stored on the computing device hosting the management application instance and to select a management application instance for routing a UI request. Thus, when a management application instance server is acting as the administrator, the UI logic 220 enables the management application instance to handle a UI request itself or route the request to another management application instance.

The registry on each of the network devices and servers hosting management application instances stores a list of management application instances and connection information that can be used to make a direct connection with the respective management application instances by way of their hosting server. The registry also stores a priority that has been assigned to each management application instance for the particular network device or management application instance. Thus, while the registry on each network device and management application instance server may list the same management application instances, the priority that is assigned to each management application instance may be different in the different registries on the different devices and management application instances.

Oracle Enterprise Manager Embodiment

In one embodiment, the management application and the agents together form an enterprise manager system. The Oracle Enterprise Manager is a monitoring, management, and administration application that includes three tiers: an application tier, an agent tier, and a repository tier. In FIG. 2, the management application instances X-Z are part of the management tier. The management tier is responsible for providing the management features including controlling communications between the network devices (also called "managed entities" or "managed targets"), monitoring the network devices by collecting operation data from the network devices, and presenting the operation data on a friendly web user interface. The management application periodically (e.g., every five seconds) pings agents in managed network devices to confirm that the agents are still active. The management application instances can be multiplexed and clustered to add more throughput and bandwidth.

In FIG. 2, the agent tier includes agents a-c which are installed on the managed network devices A-C, respectively. Each agent represents the enterprise manager system on the monitored network device. The agent collects operation data from the network device and periodically uploads the operation data to a management application instance. Operation data is data that represents an operating parameter of the network device such as available memory, number of instructions processed per second, and so on, that provides an indication of the health and usage of the network device. The agent tier is also responsible for discovering aspects of managed network devices such as applications, services, and other software processes and introducing them to a management application instance for monitoring and administration.

In FIG. 2, the management application instance stores the operation data from the agents in the repository, which is part of the repository tier. The repository tier is a database system that is configured to house the management application data and the operating data collected from the monitored network devices. The repository is secure storage that is accessible only to management application instances. The repository also serves as a work queue for all configured management application instances for the enterprise manager system.

In addition to the application, agent, and repository tiers, the enterprise manager system includes a web based user interface that is provided by the management application. The web based user interface is rendered for UI clients that contact one of the management application instances that has been designated as an administrator server that is registered with the UI service. The administrator management application instance either responds to the request itself or routes the request to another management application instance. The UI logic 220 in the management application instances receives UI requests, collects the requested data, and renders pages for the user. Enterprise manager administrators use the UI to access the data in the repository and to perform various administrative activities.

Secure Socket Layer Embodiment

In one embodiment, the agents and the management application instances all communicated via secure socket layer (SSL) communication links. The SSL link requires authentication and/or certificate exchanges before the link can be established. In FIG. 2, the management application issues a unique SSL certificate to hardware (e.g., server) hosting each management application instance. The certificate is exchanged with the agents to be used to authenticate and validate incoming data. In one embodiment, the registry stores connection information that includes a URL and/or the certificate information for each management application instance with which the agent or management application instance may establish a connection.

Figure 3:
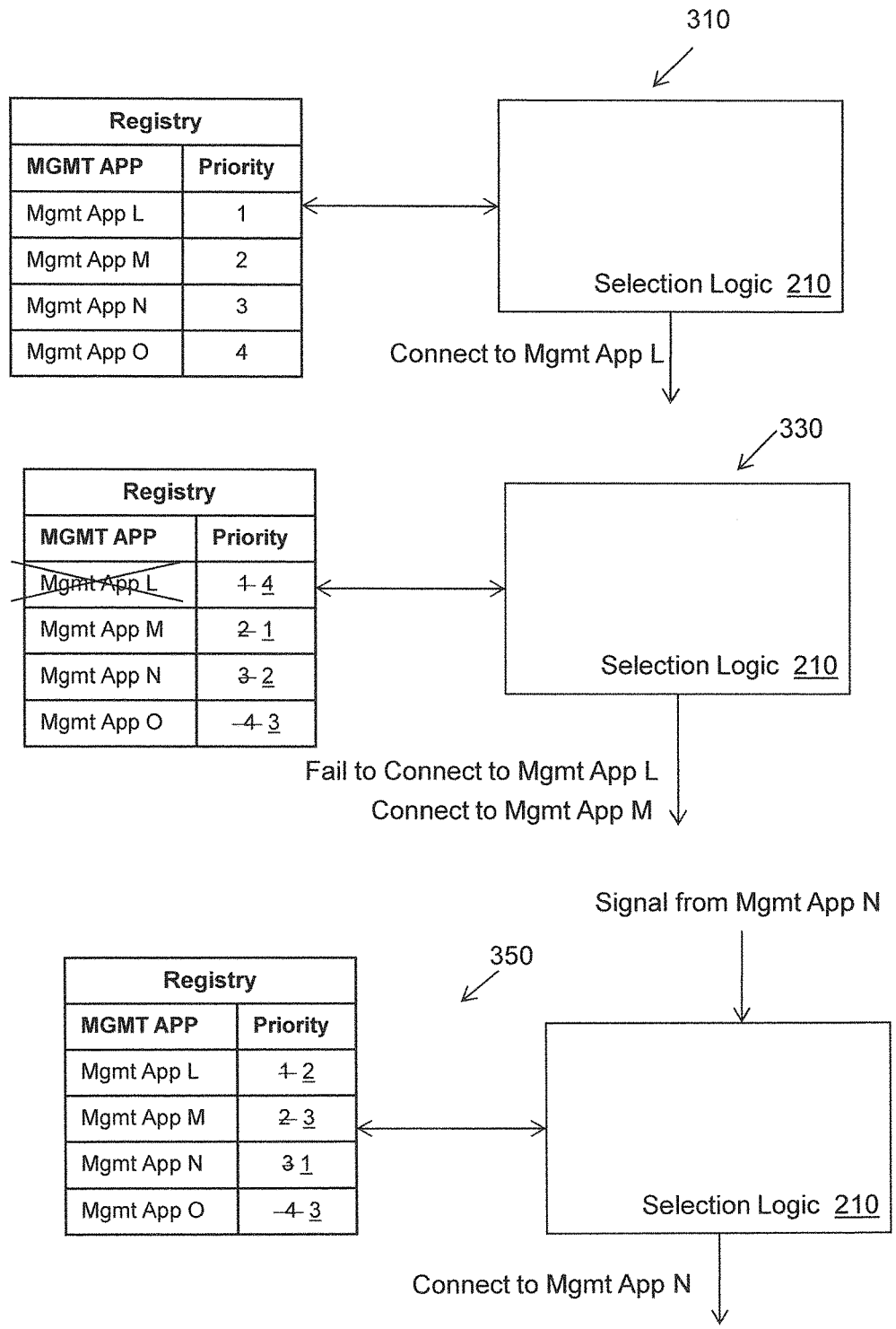
FIG. 3 illustrates an example of one embodiment of a server selection logic performing server selection in a highly available network.

Referring now to FIG. 3, at 310 a first example operation of the selection logic 210 in an agent is illustrated. Upon generating a communication for the management application (e.g., operation data for uploading to the repository or other communication), the selection logic 210 accesses the registry to determine to which management application instance it should transmit the communication. The management application instance L has the highest priority in the registry. The selection logic 210 causes the agent to connect (e.g., by exchanging certificate information in the registry and/or by accessing a URL in the registry) with management application instance L.

Figure 4A:
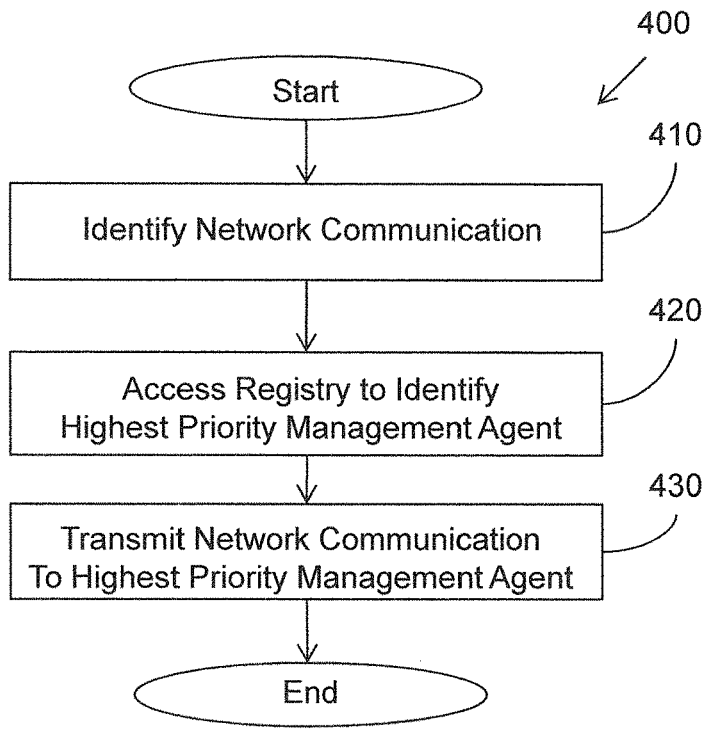
FIGS. 4A and 4B illustrate embodiments of methods associated with server selection in a highly available network.

FIG. 4A illustrates a method 400 that can be used by the selection logic 210 to determine with which management application instance to communicate. At 410 the method includes generating a network communication. At 420, the method includes accessing the registry to identify the highest priority management application instance. At 430, the method includes transmitting the network communication to the highest priority management application instance.

Returning to FIG. 3, at 330 a second example operation of the selection logic 210 in an agent is illustrated. Upon generating a communication for the management application (e.g, operation data or other communication), the selection logic 210 accesses the registry to determine to which management application instance it should transmit the communication. The management application instance L has the highest priority in the registry. The selection logic 210 causes the agent to attempt to connect (e.g., by exchanging certificate information in the registry and/or by accessing a URL in the registry) with management application instance L. The connection attempt fails.

Since a communication link with management application instance L cannot be established, the selection logic 210 accesses the registry to identify the next highest priority management application instance, which is management application instance M. The selection logic 210 causes the agent to connect to management application M and transmits the network communication. In one embodiment, the selection logic 210 may adjust the priority for management application instances L and M in light of the failed connection with management application instance L and the successful connection with management application instance M. In one embodiment, the selection logic 210 adjusts the priority of an unresponsive server to the lowest priority as shown in FIG. 3 at 330. In another embodiment, the selection logic 210 "removes" the unresponsive server (e.g., assigning a null priority) until a communication is received from the server.

Figure 4B:
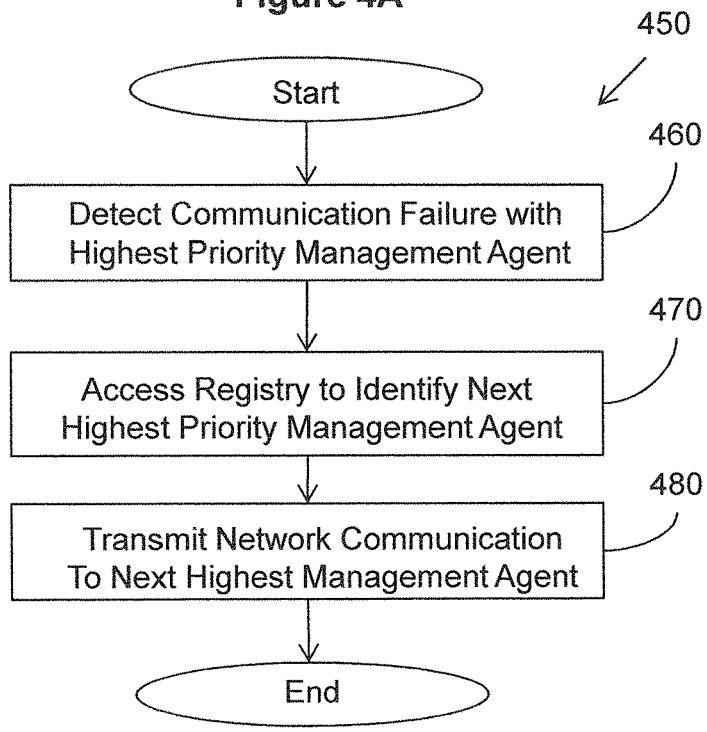

FIG. 4B illustrates a method 450 that can be used by the selection logic 210 to determine with which management application instance to communicate. At 460 the method includes detecting a communication failure with the highest priority management application instance. At 470, the method includes accessing the registry to identify the next highest priority management application instance. At 480, the method includes transmitting the network communication to the next highest priority management application instance.

The priority assigned to each management application instance in the registry may be initially set by the management application when securing an agent in a device that is new to the networked computing system. The management application sends a list of registered management application instances (e.g. server URLs, certificates, and so on) and their associated priorities to the agent. The list is stored in a registry area of the network device in the same manner the agent's configuration directory is stored. The default priority may be based on any number of factors.

In one embodiment, the default priority is based on agent's proximity to the various management application instances. This proximity is determined relative to a topology of the system's network. For example, the internet address and/or subnet mask of the device hosting the agent may be compared to the internet address and/or subnet mask of the registered management application instances. Registered management application instances having the same subnet mask are deemed to be close to the agent. In one embodiment, the communication response time between the device hosting the agent and the registered management application instances is recorded and priority is assigned in order of response speed. In one embodiment, priority is assigned based on communications received from the registered management application instances that communicate a desired priority. In one embodiment, priority is assigned based on receipt of "ping" messages from registered management application instances.

The selection logic 210 is capable of adjusting the priority assigned to the management application instances in the registry. In one embodiment, illustrated in FIG. 3 at 350, the selection logic 210 is configured to assign a highest priority to a management application instance that most recently communicated with the agent. Recall that one of the management application instances will ping the agent periodically. In the example shown at 350, management application instance N pings (or otherwise communicates with) the agent. The selection logic 210 adjusts the priority assigned to management application instance N in the registry to make management application instance N the highest priority management application instance.

When the agent has a network communication to transmit, the selection logic 210 will determine that management application instance N has the highest priority and cause the agent to transmit the network communication to management application instance N. If a connection cannot be established with management application instance N, the selection logic 210 will continue to cause the agent to try to establish a connection with the next highest priority management application instance until the agent finds a management application instance with which it can connect or a management application instance pings the agent. If a management application instance pings the agent, the agent sends an ACK packet that includes a flag that alerts the management application instance to expect a network communication from this agent. The selection logic 210 then causes the agent to transmit the network communication to the management application instance to which it just sent the ACK packet.

In one embodiment, the management application instances contact monitored agents every few seconds. If there are multiple management application instances, a queue may be built in the repository database and all the management application instances pull from this queue and mark the agent status as they get an ACK from the agent. So, the management application instance that contacted an agent last time will be used by the agent the next time the agent needs to communicate operation data or send an alert. In most cases, the least busy management application instance will be the one that contacts the agent, making the management application instance a suitable choice for the agent for sending the next communication.

In one embodiment, the management application will consider network latency or geographic locations of each managed agent and build a table of which agents should contact which management application instance based on the selected parameter. In this embodiment, the agent will receive an additional flag from the management application instance to which it is being assigned. Thus, in this embodiment, the decision about how to prioritize management application instances in the registry is made by the management application.

Figure 5:
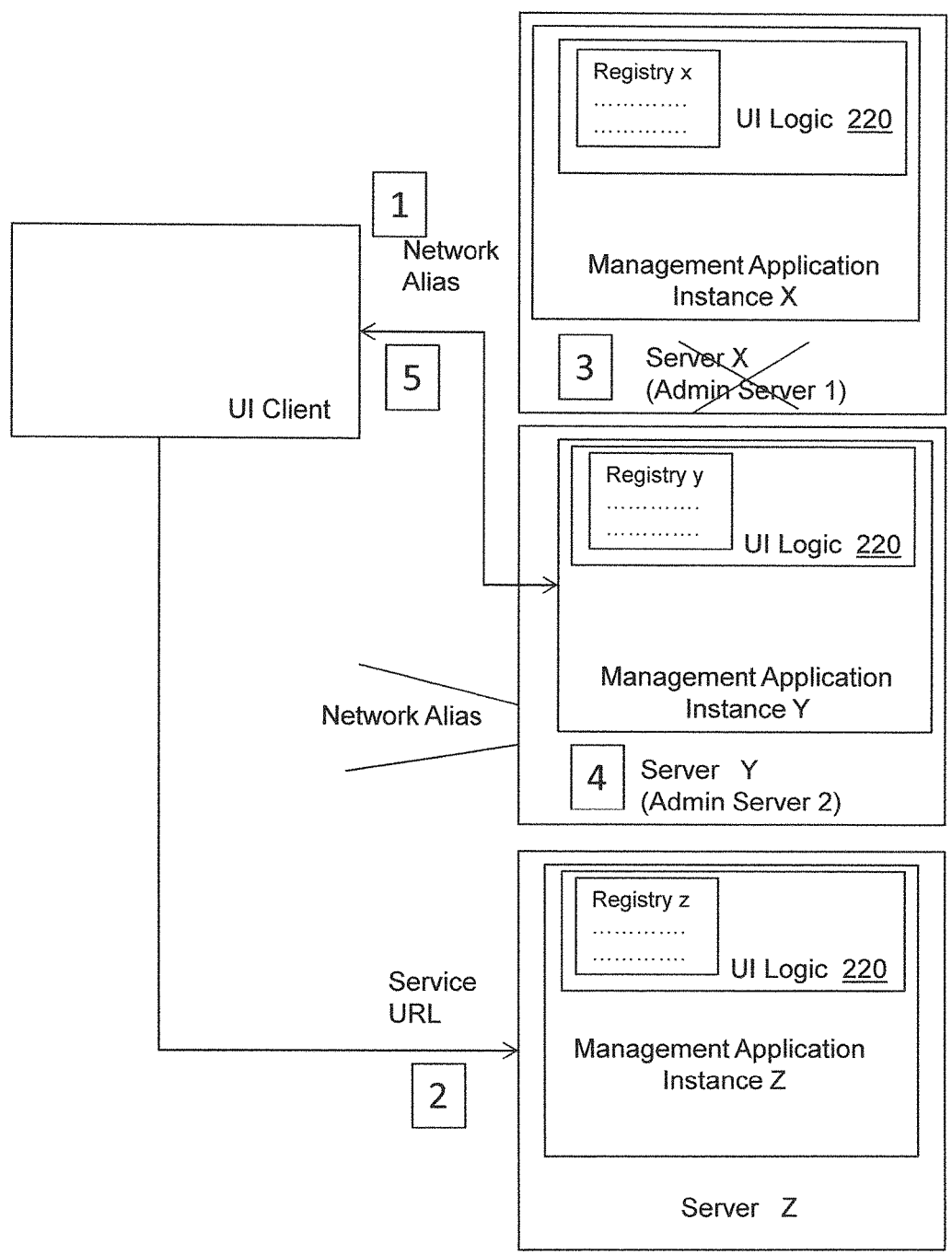
FIG. 5 illustrates an example of one embodiment of a user interface logic performing server selection in a highly available network.
Figure 6:
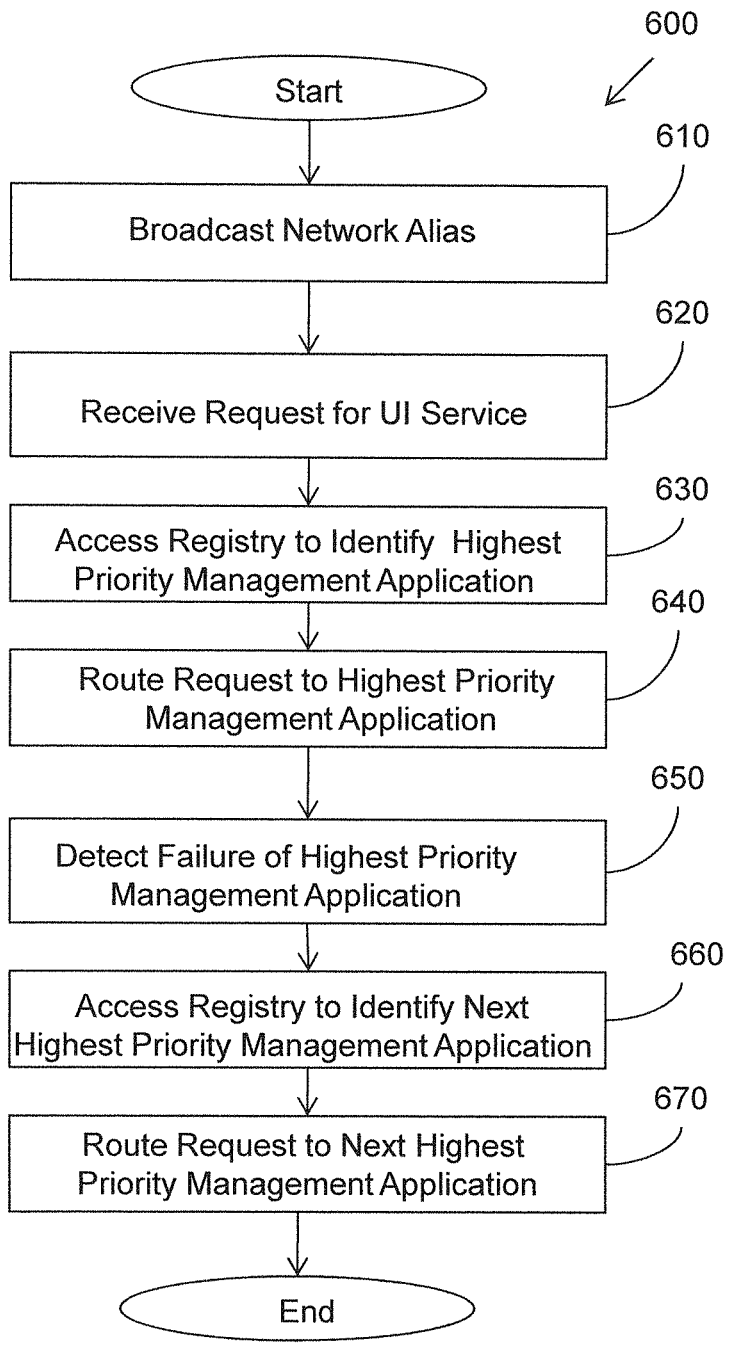
FIG. 6 illustrates another embodiment of a method associated with server selection in a highly available network.

FIGS. 5 and 6 illustrate the operation of one example embodiment of the UI logic 220 in processing requests for UI service without utilizing a load balancer. In FIG. 5 management application instances X-Z installed on servers X-Z, respectively are shown. Each management application instance includes UI logic 220 and a registry. Initially, server X has been designated by the management application as the administrator. The management application instance X has broadcasted a network alias to all UI service subscribers. As indicated by "1" a UI client requests UI service using the network alias and the request is received by management application instance X. The UI logic 220 in management application instance X accesses its registry and determines that the request should be routed to management application instance Z and provides a service URL (e.g., connection information for management application instance Z) to the UI client. For example, the UI logic 220 might select a management application instance installed on the closest server to the UI client. At "2" the UI client uses the service URL to establish a connection (e.g., a secure socket) with management application instance Z and requests UI service.

If at any point, management application instance Z fails, management application instance X would be notified and the UI logic 220 in management application instance X would access its registry to determine which management application instance should service the UI client's request in the absence of management application instance Z. The UI logic 220 would cause management application instance X to redirect the UI client's request or session to the new management application instance and the UI client would re-authenticate with the new management application instance X and establish a secure connection.

At 3 server X fails. Server Y is designated by the management application as the new administrator server. At 4, the UI logic in management application instance Y broadcasts the network alias to be used by UI clients for UI service. At 5, the UI client transmits its request to server Y and the management application instance Y will access its registry to route the request.

FIG. 6 illustrates one example embodiment of a method 600 that may be performed by the UI logic 220 to process UI requests in the absence of a load balancer. At 610, the method includes broadcasting a network alias to all UI clients to be used for transmitting UI requests. At 620, the method includes receiving a request for UI service and, at 630, accessing the registry to determine the highest priority management application instance (which may be mapped to the specific UI client). At 640, the method includes routing the request to the highest priority management application instance. In one embodiment, the request is routed by providing a service URL for the highest priority management application instance to the UI client. At 650, failure of the highest priority management application instance is detected. At 660, the method includes accessing the registry to determine the next highest priority management application instance (which may be mapped to the specific UI client). At 670, the method includes routing the request to the next highest priority management application instance.

As can be seen from the foregoing description, the described embodiments provide a highly available network that does not rely on a load balancer to serve as the point of entry to the management application instances. Network devices and the management application instances include logic and a locally stored registry that enable the network devices and management application instances to select a management application instance with which to communicate.

Computing Device Embodiment

Figure 7:
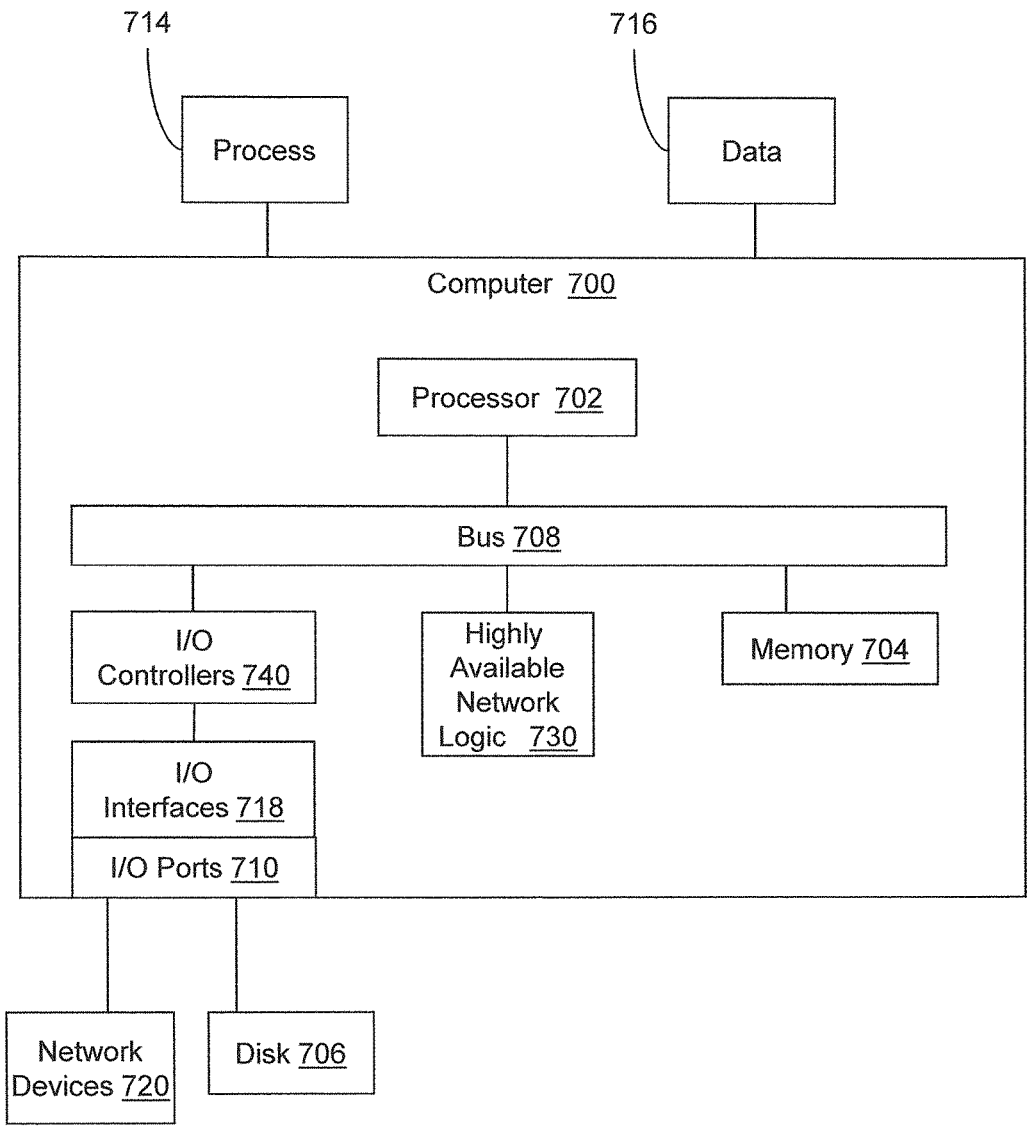
FIG. 7 illustrates an embodiment of a computing system configured with the example systems and/or methods disclosed.

FIG. 7 illustrates an example computing device that is configured and/or programmed with one or more of the example systems and methods described herein, and/or equivalents. The network device and/or the computing devices implementing the management application instances of FIGS. 2-6 may be embodied as the described computing device. The example computing device may be a computer 700 that includes a processor 702, a memory 704, and input/output ports 710 operably connected by a bus 708. In one example, the computer 700 includes highly available network logic 730 configured to support a highly available network without the use of a load balancer. The memory 704 may be configured to store the registry of FIGS. 1-6.

The highly available network logic 730 includes one or both of the selection logic 210 and the UI logic 220 described with respect to FIGS. 1-6 and in some embodiments performs one or more of the methods 400 and 450 of FIG. 4 and method 600 of FIG. 6. In different examples, the highly available network logic 730 may be implemented in hardware, a non-transitory computer-readable medium with stored instructions, firmware, and/or combinations thereof. While the highly available network logic 730 is illustrated as a hardware component attached to the bus 708, it is to be appreciated that in one example, the highly available network logic 730 could be implemented in the processor 702.

In one embodiment, highly available network logic 730, or the computer is a means (e.g., hardware, non-transitory computer-readable medium, firmware) for performing the functions for selecting a management application instance with which to communicate as described with respect to FIGS. 1-6.

In one embodiment, highly available network logic 730 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on).

The means may be implemented, for example, as an application specific integrated circuit (ASIC) programmed to perform the functions described with respect to FIGS. 1-6. The means may also be implemented as stored computer executable instructions that are presented to computer 700 as data 716 that are temporarily stored in memory 704 and then executed by processor 702.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, read-only memory (ROM), programmable ROM (PROM), and so on. Volatile memory may include, for example, random access memory (RAM), static RAM (SRAM), dynamic RAM (DRAM), and so on.

A storage disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a compact disc—ROM (CD-ROM) drive, a CD recordable (CD-R) drive, a CD rewritable (CD-RW) drive, a digital video disk (DVD) ROM, and so on. The memory 704 can store a process 714 and/or a data 716, for example. The disk 706 and/or the memory 704 can store an operating system that controls and allocates resources of the computer 700.

The computer 700 may interact with input/output devices via the I/O interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and universal serial bus (USB) ports.

The computer 700 can operate in a network environment and thus may be connected to the network devices 720 via the input/output (I/O) interfaces 718, and/or the I/O ports 710. Through the network devices 720, the computer 700 may interact with a network. Through the network, the computer 700 may be logically connected to remote computers. Networks with which the computer 700 may interact include, but are not limited to, a local area network (LAN), a wide area network (WAN), and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C. § 101.

"Logic", as used herein, represents a component that is implemented with computer or electrical hardware, firmware, a non-transitory medium with stored instructions of an executable application or program module, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, any of which are configured to perform one or more of the disclosed functions. In one embodiment, logic may include one or more gates, combinations of gates, or other circuit components configured to perform one or more of the disclosed functions. Wherein multiple logics are described, it may be possible to incorporate the multiple logics into one logic. Similarly, wherein a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing computer-executable instructions that when executed by a computer processor provided to a computer system, cause the computer system to:
   identify a network communication intended for a management application;
   receive a registry of management application instances over a communication network, wherein the registry stores, for each of the management application instances, connection information used to communicate with the management application instance, wherein the registry also stores an associated priority for each of the management application instances, and further wherein one or more of the associated priorities is set by one or more of the management application instances in response to a periodic status check of one or more network devices managed by the management application, the periodic status check being initiated by the one or more management application instances to determine an availability of the one or more network devices to participate in network communications;
   access the registry to identify a management application instance in the registry having a highest associated priority;
   receive a second network communication comprising a given instance of the periodic status check from a management application instance that is different from the highest priority management application instance;
   change, in response to receipt of the second network communication, the priority of the highest priority management application instance to a lower priority;
   access, after the changing, the registry to identify a management application instance in the registry having a new highest associated priority; and
   transmit the network communication to the new highest priority management application instance.

2. The non-transitory computer storage medium of claim 1, wherein the computer-executable instructions cause the computer system to:
   determine that the new highest priority management application instance cannot receive the transmission;
   access the registry;
   identify a management application instance in the registry having a next highest associated priority; and
   transmit the network communication to the next highest priority management application instance.

3. The non-transitory computer storage medium of claim 1, wherein the computer-executable instructions cause the computer system to:
   determine that the new highest priority management application instance cannot receive the transmission; and
   change the priority of the new highest priority management application instance to a lower priority.

4. The non-transitory computer storage medium of claim 1, wherein the computer-executable instructions cause the computer system to:
   assign the new highest priority to the different priority management application instance.

5. The non-transitory computer storage medium of claim 1, wherein the computer-executable instructions cause the computer system to:
   receive a network communication from a second management application instance, that is different from the highest priority management application instance, wherein the network communication identifies the second management application instance as the highest priority management instance;
   change the priority of the highest priority management application instance to a lower priority; and
   assign the highest priority to the second management application instance.

6. The non-transitory computer storage medium of claim 1, wherein the network communication comprises a request for a graphic user interface access to data in a repository, wherein the graphic user interface is rendered by the management application.

7. The non-transitory computer storage medium of claim 1, wherein the computer-executable instructions cause the computer system to transmit the network communication directly to the new highest priority management application instance using the connection information without accessing a load balancer that selects a management application instance.

8. The non-transitory computer storage medium of claim 1, wherein the computer-executable instructions cause the computer system to determine an initial priority to the management application instances in the registry based, at least in part, on a topology associated with a computer system that includes the management application instances and the network devices.

9. The non-transitory computer storage medium of claim 1, wherein the computer-executable instructions cause the computer system to determine an initial priority to the management application instances in the registry based, at least in part, on observed communication times between the network devices and the management application instances.

10. A computing system, comprising:
    a plurality of management application instances configured to manage network devices; and
    a plurality of network devices comprising:
       computer storage medium configured to store a registry of management application instances, wherein the registry stores, for each of the management application instances, connection information used to communicate with the management application instance, further wherein the registry stores an associated priority for each of the management application instances, and one or more of the associated priorities is set by one or more of the management application instances in response to a periodic status check of one or more network devices managed by the management application, the periodic status check being initiated by the one or more management application instances to determine an availability of the one or more network devices to participate in network communications;
       an agent configured to identify a network communication intended for a management application instance;

selection logic configured to:
- access the registry;
- identify a management application instance in the registry having a highest associated priority;
- receive a second network communication comprising a given instance of the periodic status check from a management application instance that is different from the highest priority management application instance;
- change, in response to receipt of the second network communication, the priority of the highest priority management application instance to a lower priority;
- access, after the changing, the registry to identify a management application instance in the registry having a new highest associated priority; and
- cause the agent to transmit the network communication to the new highest priority management application instance.

11. The computing system of claim 10, wherein the selection logic is configured to:
- determine that the new highest priority management application instance cannot receive the transmission;
- access the registry;
- identify a management application instance in the registry having a next highest associated priority; and
- cause the agent to transmit the network communication to the next highest priority management application instance.

12. The computing system of claim 10, wherein the selection logic is configured to:
- determine that the new highest priority management application instance cannot receive the transmission; and
- change the priority of the new highest priority management application instance to a lower priority.

13. A computer-implemented method comprising:
- identifying a network communication intended for a management application;
- accessing a registry of management application instances, wherein the registry records, for each management application instance, connection information used to communicate with the management application instance, wherein the registry records an associated priority for each management application instance, and further wherein one or more of the associated priorities is set by one or more management application instances in response to a periodic status check of one or more network devices managed by the management application, the periodic status check being initiated by the one or more management application instances to determine an availability of the one or more network devices to participate in network communications;
- identifying a management application instance in the registry having a highest associated priority;
- receiving a second network communication comprising a given instance of the periodic status check from a management application instance that is different from the highest priority management application instance;
- changing, in response to receiving the second network communication, the priority of the highest priority management application instance to a lower priority;
- accessing, after the changing, the registry to identify a management application instance in the registry having a new highest associated priority; and
- transmitting the network communication to the new highest priority management application instance.

14. The computer-implemented method of claim 13, further comprising:
- determining that the new highest priority management application instance cannot receive the transmission;
- accessing the registry;
- identifying a management application instance in the registry having a next highest associated priority; and
- transmitting the network communication to the next highest priority management application instance.

15. The computer-implemented method of claim 13, further comprising:
- determining that the new highest priority management application instance cannot receive the transmission; and
- changing the priority of the new highest priority management application instance to a lower priority.

16. The computer-implemented method of claim 13, further comprising:
- assigning the new highest priority to the different priority management application instance.

17. The computer-implemented method of claim 14, further comprising:
- using the connection information to negotiate a socket with the new highest priority management application instance; and
- transmitting the network communication to the new highest priority management application instance by way of the socket.

18. The computer-implemented method of claim 13, further comprising determining an initial priority to the management application instances in the registry based, at least in part, on a topology associated with a computer system that includes the management application instances and the network devices.

19. The computer-implemented method of claim 14, further comprising determining an initial priority to the management application instances in the registry based, at least in part, on observed communication times between the network devices and the management application instances.

20. The computer-implemented method of claim 14, further comprising transmitting the network communication directly to the new highest priority management application instance using the connection information without accessing a load balancer that selects a management application instance.

* * * * *